United States Patent
Wang et al.

(10) Patent No.: US 12,354,115 B2
(45) Date of Patent: Jul. 8, 2025

(54) TECHNIQUE FOR ASSESSING TRUST BASED ON COMPANY EMAIL DOMAIN DATA

(71) Applicant: Microsoft Technology Licensing, LLC, Redmond, WA (US)

(72) Inventors: Dongyang Wang, Belmont, CA (US); Li Zhou, Sunnyvale, CA (US); Cheng Deng, Santa Clara, CA (US); Yu Wang, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1101 days.

(21) Appl. No.: 17/237,827

(22) Filed: Apr. 22, 2021

(65) Prior Publication Data

US 2022/0343336 A1    Oct. 27, 2022

(51) Int. Cl.
*G06F 16/35* (2025.01)
*G06F 17/18* (2006.01)
*G06N 20/00* (2019.01)
*G06Q 10/1053* (2023.01)
*G06Q 30/018* (2023.01)
*G06F 40/205* (2020.01)

(52) U.S. Cl.
CPC ........... *G06Q 30/018* (2013.01); *G06F 17/18* (2013.01); *G06N 20/00* (2019.01); *G06Q 10/1053* (2013.01); *G06F 40/205* (2020.01)

(58) Field of Classification Search
CPC .............. G06Q 30/018; G06Q 10/1053; G06F 17/18; G06F 40/205; G06N 20/00
See application file for complete search history.

(56) References Cited

U.S. PATENT DOCUMENTS 11,443,004 B1 *   9/2022   Brody ................. G06F 16/9538
2020/0210466 A1 *   7/2020   Yin ........................ G06F 16/313

FOREIGN PATENT DOCUMENTS

WO     WO-2019227071 A1 * 11/2019   .......... G06F 11/3024

* cited by examiner

*Primary Examiner* — Hassan Mrabi
(74) *Attorney, Agent, or Firm* — Cantor Colburn LLP; Renee D. Brown

(57) ABSTRACT

Described herein is a technique for establishing an overall company-level confidence score based on analyzing data from various data sources. The overall score is derived using a machine learned model that takes as input a set of sub-scores, with each sub-score representing a measure of how frequently a domain name occurs within the same data record as a company name. The model used to combine the several sub-scores is trained using training data that includes a variety of sub-scores for company and domain names that have already been verified to be associated with one another.

20 Claims, 8 Drawing Sheets

TECHNIQUE FOR ASSESSING TRUST BASED ON COMPANY EMAIL DOMAIN DATA

TECHNICAL FIELD

The present application generally relates to a technical improvement in the manner by which a provider of an online service establishes trust in a user transacting on behalf of a company. Specifically, the present application involves the use of a supervised machine learning algorithm to learn a model for generating a confidence score for a company to domain mapping, where each input of the several inputs to the learned model is a metric based on a co-occurrence frequency of a company name and a domain name within data records from a specific data source.

BACKGROUND

With online services, transactions conveniently occur without people (e.g., the transacting parties) being physically present in the same location so that they can interact and have face-to face conversations. This ability to transact from any location provides obvious advantages, but it also makes it difficult to verify the identity of a party with whom the transaction is being entered. This identity verification problem is compounded when an online transaction is automated by an online service, so that only one person is actively involved in the transaction. For instance, one person may interact via a user interface to provide information and specify a form of payment to complete a transaction with an online service, without directly interacting with another person. Accordingly, the online service, or more specifically the organization operating the online service, must have trust in the people who are transacting with the online service. Another issue that can further complicate matters occurs when the party who is transacting is doing so for the benefit, or on behalf, of a company or organization, as it may be the case that the identification of both the person and the company are unknown.

By way of example, consider the scenario where an end-user of an online job hosting service is initiating a request to post to the service an online job posting on behalf of a company. The person interacting with the online job hosting service may or may not be known to and/or verified by the online job hosting service. Furthermore, the company or organization on whose behalf the online job posting is being posted may be unknown and/or unverified. For a wide variety of reasons, the operator of an online service may prefer to both verify and validate the identities of the parties with whom they are transacting. For instance, in the context of an online job hosting service, fraudulent transactions may be attempted as a form of corporate espionage. A fraudster may post an online job posting relating to a job available at a company with which the fraudster has no relationship. The fraudster may do this for the purpose of encouraging others to submit job applications for the job, thereby providing information to the fraudster that they would not otherwise provide.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
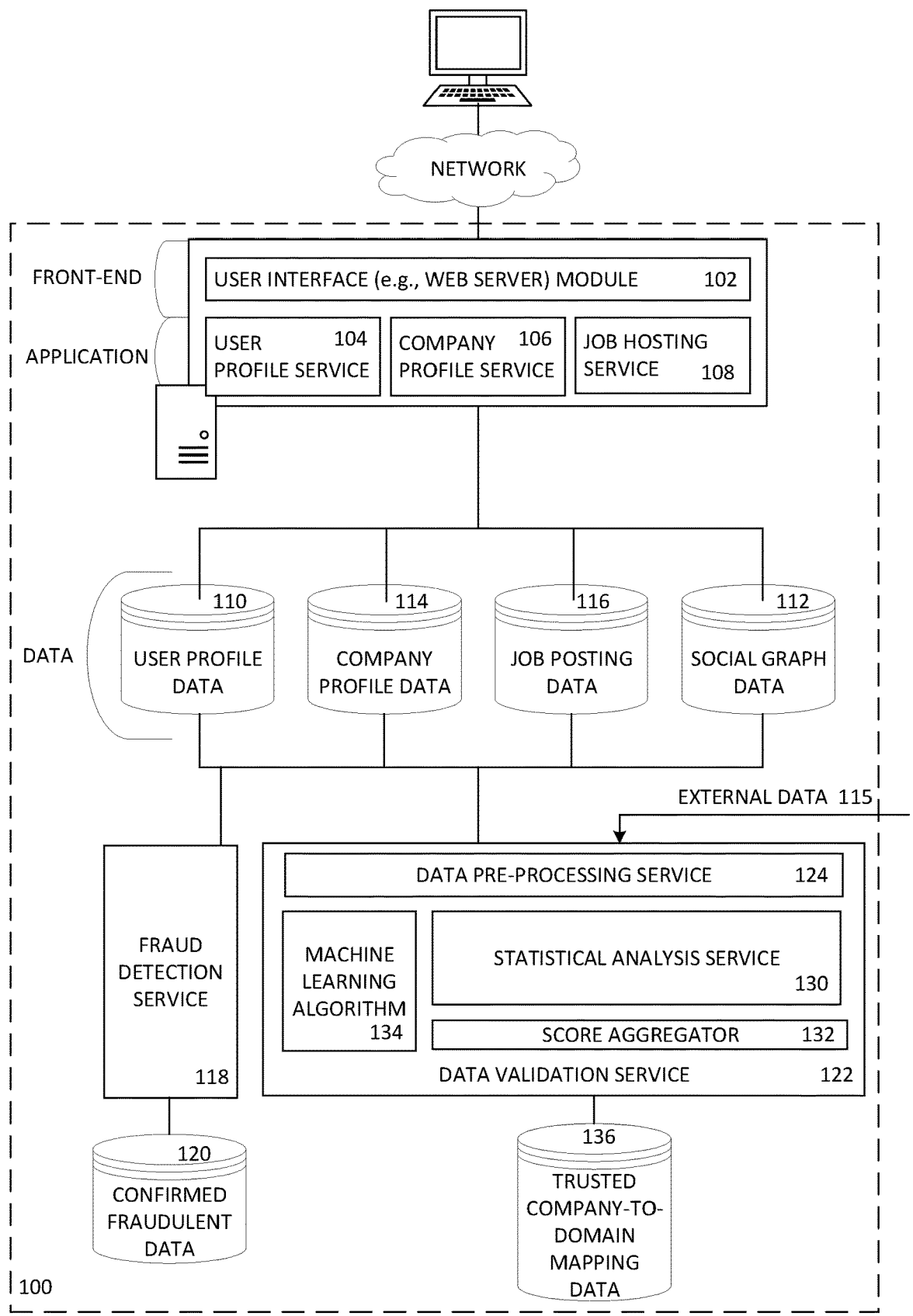
FIG. 1 is a system level diagram illustrating an example of the various functional components that comprise a system via which an embodiment of the present invention may be implemented.

Described herein are methods and systems for leveraging data from a variety of data sources to derive a trust metric—for example, a confidence score—for a company to domain mapping. To derive a confidence score for a particular company to domain mapping, a machine learning algorithm that utilizes a supervised, linear regression technique, is used to learn a model, and in particular a set of weighting factors used by the model to weight individual inputs to the model that determine the confidence score for the company to domain mapping. The machine learned model is then provided, as input, a set of sub-scores, with each sub-score representing a measure of likelihood that a company is associated with a particular domain, as determined using a statistical analysis software library to perform statistical analysis of data records from a particular data source. The output of the machine learned model is a confidence score that represents a likelihood or probability, based on observed or sampled data, that a particular company is actually associated with a specific domain. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

In the context of online transactions, a provider of an online service may deploy a variety of techniques for verifying and validating the identity of transacting parties. In many instances, the online service provider may employ people to manually review information provided by a party to a transaction in an effort to confirm the identity of the party. Of course, this manual review of information by an employee of the online service provider tends to slow down the speed with which a transaction can be processed and concluded. Moreover, the manual review of information is generally very costly due to the labor costs involved. Automating the process by which the identity of a transacting party is validated is extremely difficult, as there simply is no publicly available data source providing ground truth information from which reasonable conclusions might be drawn as to the validity of the identity of a party, whether it be a person, company or organization.

Consistent with embodiments of the present invention, the provider of an online service leverages a variety of data sources by performing statistical analysis on those data sources to ascertain the extent to which a company name co-occurs with a domain name within the data records of a particular data source. For example, within data records from various data sources, the co-occurrence of a company name (e.g., "ACME Corp.") and a domain name (e.g., "acme.com") may indicate a relationship or association between the company and the domain. When a user of an online service registers with the online service and creates a user profile, the user may be prompted to provide contact information, such as an email address, as well as the name of a company at which the user is currently employed, along with a variety of other information. In many instances, the domain name specified as part of the user's email address will correspond with the company name at which the user is employed. That is, the domain name will be registered to and owned by the company at which the user is employed. By parsing user profiles to identify the relevant information and then aggregating this information over an entire set of data records corresponding with individual user profiles, or some substantially significant number of data records, a statistical distribution can be derived for each domain name that appears in a data record, where each statistical distribution indicates for a particular domain name a measure of frequency with which each of several company names occurs in the same data record as the domain name.

After the data records of a data source have been parsed to identify the relevant data and generate the statistical distributions, using a software-implemented algorithm that uses a statistical software analysis library, one or more statistical tests may be executed against the statistical distributions. As described in greater detail below, a statistical test referred to as a uniformity test may be applied to a distribution to determine whether a particular distribution is uniform, or non-uniform. In those instances when the result of the uniformity test indicates that a particular distribution is determined to be a uniform distribution, this suggests that there is a very low likelihood or probability of there being an actual relationship between the company and any one of the domains included in the distribution. However, in those instances when a particular distribution is determined to be non-uniform, further analysis is performed to determine if the data indicates a strong association between a particular domain name and a company. If, for example, a distribution for a specific company and several domains indicates that one domain name tends to frequently be present within user profiles that indicate a particular company as the current employer of the user, this may suggest that the domain name is owned by the company. By way of example, assume that a statistical distribution for the domain, "acme.com." indicates a relative frequency of 0.78 for the company, "ACME Corp.," and a relative frequency of 0.06 for the company, "Widgets Inc." The very low relative frequency (0.06) associated with the company, "Widgets Inc." indicates a very low likelihood or probability of there being any actual association or relationship between the company, "Widgets Inc." and the domain, "acme.com." However, the higher relative frequency (0.75) for the company to domain mapping for the pairing of "ACME Corp." and "acme.com" indicates a stronger likelihood or probability of there being an actual association or relationship between the company and the domain. As described in greater detail below, one advantage of the present invention is that multiple sources of data are analyzed in parallel so that a confidence score for a particular combination of company and domain can be derived from each separate data source. These individual confidence scores, referred to herein as sub-scores, are then combined via a machine learned model to derive an overall, company-level confidence score for a particular company to domain mapping.

While the statistical analysis presented above is described as being done with user profile data, this same type of analysis may be applied to more than one data source. For instance, in the example set forth immediately above, the statistical distributions are described as being generated by analyzing individual data records for a particular data source—specifically, user profiles. Another data source that may be analyzed is online job postings. For example, when a user of an online job hosting service interacts with the job hosting service to generate an online job posting, the user may be prompted to provide a variety of information, to include: a company name for the company offering a job described in the online job posting, an email address via which job applications are to be submitted by job applicants, an email address for one or more contact persons associated in some way with the job (e.g., a hiring manager) or with the online job posting (e.g., a company recruiter), and a uniform resource locator (URL) associated with a website of the company offering the job described in the online job posting and via which job applications may be submitted. By analyzing the individual data records associated with each job posting, the frequency with which a company name occurs in a particular data record with a domain name can be determined. For instance, each email address as well as any URL used in or with the job posting will have a domain name. When this information is aggregated over the entire set of data records, or for some substantial number of data records, a statistical distribution for each particular domain name can be generated. For example, the statistical distribution may be a frequency distribution based on a raw count of the co-occurrences of each company with the particular domain. Alternatively, the frequency distribution may be normalized, for example, by dividing the raw count by the total number of observations, to derive a relative frequency distribution. In both cases, the actual observed data are being used as confidence scores to infer or predict the existence of an actual association or relationship between a company and a domain.

Other examples of data sources that may be analyzed in this manner include data records associated with customer and/or third-party vendors of the provider of the online service, or similar data records obtained from one or more partner or subsidiary companies. For example, a provider of an online service may have an internal sales team that, through the course of conducting business with customers, obtains a significant volume of data relating to various customers. Similarly, information relating to third-party vendors may be maintained. Such information may be analyzed in the manner described above to derive statistical distributions indicating how frequently particular domain names occur in the same data record as a particular company name or company identifier.

Consistent with some embodiments of the present invention, in order to generate an overall, company-level confidence score for a particular company to domain mapping, several individual confidence scores—one derived from each data source—are combined using a linear weighted combination. As these individual sub-scores are the inputs to the machine learned model that outputs the final company-level confidence score for the company to domain mapping, these individual confidence scores are referred to herein as sub-scores. Each sub-score associated with the same company to domain mapping is multiplied by a weighting factor that is associated with a particular source of data. By way of example, consider a scenario where an analysis of user profiles indicates a current employer with the company name, "ACME Corp.," in sixty percent of the data records (e.g., user profiles) that also indicate an email address with domain name, "acme.com," while analysis of online job postings indicates a company name, "ACME Corp." occurs in eighty percent of data records that have an email address with domain name, "acme.com." Furthermore, an analysis of some third data source indicates that the company name, "ACME Corp." occurs with domain name "acme.com" in seventy-five percent of the data records. In this example, each of the three measures of frequency represent a sub-score from which the overall company-level confidence score for the company to domain mapping is derived. Consistent with some embodiments, the three sub-scores are combined as a weighted linear combination, with the weighting factors applied to each sub-score having been determined via a supervised machine learning algorithm, using an objective function or loss function that is consistent with a linear regression technique. Each weighting factor is derived to reflect the importance or accuracy of a particular data source in predicting an association between a company and a domain.

Consistent with some embodiments of the invention, the weighting factors are derived using a linear regression technique. As a supervised technique, the training data for training the model includes sub-scores for domain names and companies that have already been confirmed to be associated with one another, or already confirmed to not be associated with one another. That is, the training data includes a combination of positive examples, where a relationship between a company and a domain has been confirmed to actually exist, and negative examples, where a relationship between a company and a domain name has been confirmed to not exist. Accordingly, each instance of an item of training data used to learn the weighting factors of the model may include a set of sub-scores with each sub-score representing a measure of frequency of a company name occurring within the same data record as a particular domain name, as determined from analyzing data from a particular data source, for a domain name and company that have already been confirmed to be related or confirmed to be not related. In this context, for the purpose of labeling the training data, confirmation or validation of the existence or non-existence of a relationship between a company name and domain name may be achieved through crowdsourcing or some similar manual review technique.

Once an overall company-level confidence score has been derived for a given company to domain mapping, the probability score for the company to domain mapping is compared with a threshold to determine whether or not the company should be added to a database storing information relating to trusted company to domain mappings. For instance, if the company-level confidence score for the company to domain mapping is high, such that it exceeds the threshold, the company to domain mapping may be added to the trusted company database to reflect that there is a high probability that the domain name is owned by, or in use by, the company. Alternatively, if the company-level confidence score derived for a company to domain mapping is generally low, such that the company-level confidence score is less than the threshold, the company to domain mapping will not be added to the trusted company database.

Consistent with some embodiments, the result of the above-described data processing is a database with data identifying trusted company to domain mappings. Specifically, with some embodiments, the resulting data stored in the database will include information indicating a company identifier or name, one or more domain names, and a confidence score for each domain name indicating the likelihood or probability that the domain is owned by, in use by, or otherwise associated with the company of record.

When a user makes a request to initiate a transaction of some type, such as a request to generate an online job posting with an online job hosting service, the user is prompted to provide his or her email address. The domain name portion of the user's email address can then be used to search the data records in the trusted company to domain mapping database to determine if the domain is associated with a trusted company to domain mapping. If the domain portion of the user's email address is associated with a trusted company to domain mapping, and the user's email address has already been verified, then the user will be allowed to generate an online job posting on behalf of the company with which the user's email address (e.g., domain name) is associated, as indicated in the database. However, if the user's email address (e.g., domain name) is associated with a domain name of a trusted company to domain mapping, but the email address provided by the user has not been verified, the job hosting service will prompt the user to verify his or her email address. To verify a user's email address, the job hosting service may send a verification email to the email address provided by the user, with the content of the verification email including a verification code that the user is required to submit to the job hosting service via a web page or some alternative user interface (e.g., mobile application). If the user provides the verification code within some predetermined timeframe, the job hosting service will update the status of the user to indicate that the user has been verified. In some instances, the user's verification status will be maintained for some duration of time, after which time the user's verification status may be changed to unverified, requiring the user to go through the email verification process again.

When, as part of the online job posting flow, the user provides an email address having a domain name that is not associated with a trusted company to domain mapping as indicated in the trusted company to domain mapping database, the job hosting service may prompt the user to perform one or more additional steps in order to conclude a transaction—that is, generate an online job posting. By way of example, the user may be prompted to contact a sales associate affiliated with the provider of the online service in order to conclude the requested transaction.

Rather than simply automating the process by which data might be manually reviewed by a person, the software-based approach described herein involves using a combination of statistical analysis software and a machine learned model to combine individual confidence scores into a final, company-level confidence score indicating a likelihood or probability that a company is actually associated with a particular domain. For instance, whereas a human may be able to intuitively understand that the company, "ACME Corp." is associated with the domain, "acme.com," many company to domain name mappings are not so obvious and easy to identify. For example, a company with the name, "Atlantis Consulting Group" may use the domain name, "acg.com."

This may not be obvious to a human. However, by using the statistical analysis approach described herein, patterns that are not obvious to a human can be identified. Furthermore, analyzing data from a single data source to infer a relationship between a company and a domain name may lead to erroneous results in some instances. Advantageously, the approach described herein involves performing statistical analysis on each of several different data sources to derive individual confidence scores for each of the distinct data sources. Then, the individual confidence scores are combined, using a machine learned model, to arrive at a final company-level confidence score for a company to domain mapping. Because the importance or accuracy of each data source in predicting a relationship between a company and a domain name may vary, embodiments of the present invention advantageously use a machine learning technique to learn the importance or value of the contribution of the confidence scores from each data source, as reflected in the learned weighting factors of the machine learned model. Accordingly, the overall company-level confidence score resulting from combining the individual sub-scores will generally tend to more accurately reflect the true probability that a company is actually associated with a domain, than any one sub-score. Other details and advantages of the innovative subject matter described herein are presented in connection with the description of the various figures that follows.

FIG. 1 is a diagram showing the functional components of a system 100 for an implementation of an online service with which an embodiment of the invention might be implemented and deployed. As shown in FIG. 1, a front-end layer comprises a user interface module (e.g., a web server) 102, which receives requests from various client computing devices and communicates appropriate responses to the requesting client devices. For example, the user interface module(s) 102 may receive requests in the form of Hypertext Transfer Protocol (HTTP) requests or other web-based API requests.

An application logic layer may include one or more application server modules, which, in conjunction with the user interface module(s) 102, generate various user interfaces (e.g., web pages) with data retrieved from various data sources in a data layer. Consistent with some embodiments, individual application server modules implement the functionality associated with various applications and/or services provided by the online system/service 100. For instance, the application logic layer may include a variety of applications and services to include a user profile service 104, a company profile service 106, and a job hosting service 108.

Consistent with some embodiments, the user profile service 104 provides the user with the ability to register with the online service and provide information to be included as part of the user's user profile. By way of example, the user profile service 104 may prompt the user to enter his or her name, contact information (e.g., email address, phone number, residential address), as well as information about the user's current and past employment. For instance, the user may be prompted to provide the names of the user's current and/or past employers, as well as the job titles of any positions the user currently has or previously held with those employers, and the dates on which employment began and/or ended. As information is provided, the user profile service 104 stores the information in one or more databases, such as the database illustrated in FIG. 1 with reference number 110. The user profile of a user may be accessible to other users via a user profile page.

Once registered, a user may invite other users, or be invited by other users, to connect via the online service/system 100. A "connection" may constitute a bilateral agreement by the users, such that both users acknowledge and agree to the establishment of the connection. Similarly, with some embodiments, a user may elect to "follow" another user. In contrast to establishing a connection, the concept of "following" another user typically is a unilateral operation and, at least with some embodiments, does not require acknowledgement or approval by the user that is being followed. When one user follows another, the user may receive status updates relating to the other user, or other content items published or shared by the other user who is being followed. Similarly, when a user follows an organization, the user becomes eligible to receive status updates relating to the organization as well as content items published by, or on behalf of, the organization. For instance, content items published on behalf of an organization that a user is following may appear in the user's personalized feed, sometimes referred to as a news feed. In any case, the various associations and relationships that each user establishes with other users, or with other entities (e.g., companies, schools, organization) and objects (e.g., metadata hashtags ("#topic") used to tag content items), are stored and maintained within a database, such as the social graph database with reference number 112.

The company profile service 106 allows a registered user of the service to generate and administer a company profile for a company. Similar to how a user profile includes a variety of information relating to a user, a company profile includes a variety of information relating to and about a company. Accordingly, users can access a company's profile page to view and explore information about a company. With some embodiments, more than one user may be granted privileges to administer a company's company profile. Each administrator of a company page may be prompted to provide an email address, or other contact information. As described in greater detail below, the relationship between a domain name specified within a user's email address and a name of a company may be used to establish the validity of a company to domain mapping.

The job hosting service 108 allows users to generate online job postings to present information about a job being offered by a company or organization. These online job postings can be searched by other users (e.g., job-seekers), and in some instances, a recommendation service may present users with recommended job postings. When a user initiates a request to create an online job posting, the job hosting service will prompt the user to provide a variety of information. By way of example, a user may generally be prompted to provide information about the job being offered, such as the name of the company at which the job is being offered, the job title of the position, the job function, job requirements (e.g., skills, years of experience, professional certifications), and so forth. In addition, the user may be prompted to provide information about how a user can submit an application for the job, a Uniform Resource Locator (URL) associated with a company website of the company offering the job, and contact information for one or more people associated with the job (e.g., a hiring manager, a recruiter, a person responsible for the job posting). As will be described in greater detail below, consistent with some embodiments of the present invention, information provided as part of a job posting may be analyzed to determine a frequency with which various domain names appear with a company name in the same job posting.

When a user has initiated a request to generate a job posting, the user may or may not be asked to take one or more additional steps to ensure that the job posting is legitimate and valid. For instance, after a user has provided his or her email address, the domain name included in the email address may be used to confirm that the domain name is associated with a trusted company to domain mapping. If the domain name of the user's email address matches a domain name included in a trusted company to domain mapping, the user will be allowed to generate a job posting on behalf of the company with which the user's email address is associated, assuming the user's email address has already been verified. If, however, the user's email address, and in particular the domain name portion of the email address, does not match a domain name of a trusted company to domain mapping, the user may be required to take one or more additional steps in order to conclude a transaction.

In addition to hosting job postings that are generated via the job hosting service 108, with some embodiments, the job hosting service 108 may ingest online job postings that are being hosted at another site or by another service. For instance, the job hosting service may ingest online job postings that are hosted at a company website (e.g., "www.acme.com/jobs"), or hosted by a third-party job hosting service. Accordingly, each ingested job posting will generally have a URL indicating the site or service from which the job posting was ingested and generated. The domain name of the URL from which a job posting was ingested and generated may be used, as described in greater detail below, to assess and confirm a company to domain mapping, by determining how frequently a company name occurs in a job posting with particular domain name from a URL associated with a site from which a job posting was ingested.

The aforementioned applications and services are presented here as examples and are not meant to be an exhaustive listing of all applications and services that may be integrated with and provided as part of an online service. For example, although not shown in FIG. 1, an online system/service 100 may also include a feed, or news feed, service via which users are able to both post and consume content, such as news articles, and such. As users interact with the various user interfaces and content items presented by these applications and services, their actions may be logged for subsequent use in one or more recommendation engines, such as the aforementioned job posting recommendation service.

As shown in FIG. 1, the data layer may include several databases, such as a user profile database 110 for storing user profile data generated with the user profile service 104, and a company profile database 114 for storing information generated by the company profile service 106. Additionally, as shown in FIG. 1, the data layer includes a database for storing company profile data 114, and a database for storing job postings 116. A social graph database 112 stores information about relationships between users and various other entities.

Consistent with some embodiments, data stored in the various databases of the data layer may be accessed by one or more back-end software applications or services—that is, software applications and services that are not consumer-facing. For instance, as illustrated in FIG. 1, a fraud detection service 118 may obtain data from one or more databases in the data layer for the purpose of processing the data to identify fraudulent activity and/or fraudulent entities, such as fake user profiles, fake company profiles, and/or content that may be characterized as SPAM. When the fraud detection service 118 identifies a fraudulent or fake profile, the confirmed fraudulent data may be stored in a database 120 for subsequent use in identifying additional fraudulent activity, and so forth. Accordingly, when generating a confidence score for a company to domain mapping, any data (e.g., domain names, company names, etc.) known to be fake or fraudulent can be filtered out and excluded from the relevant analysis.

Consistent with embodiments of the present invention, a data validation service 122 is a back-end application that obtains and analyzes data from one or more databases in the data layer for the purpose of validating the data. Specifically, the data validation service 122 processes data using statistical analysis to provide for data-driven inferences regarding the existence of an actual relationship between companies and domains. As described in greater detail below, the data validation service 122 obtains individual data records from various data sources in the data layer. The data records obtained from the data layer are first pre-processed by a data pre-processing service 124 to parse and identify relevant data within the data records and ensure that the data is in a proper format for subsequent analysis. By way of example, pre-processing the data may involve parsing email addresses and/or URLs to identify relevant domain names within the email addresses and/or URLs. Additionally, pre-processing the data records may involve filtering out and excluding data that is known to be associated with certain companies (e.g., public email service providers), and any data known to be fraudulent, fake, or otherwise included in a list of data to be excluded. In some instances, particularly with data that may be imported or obtained from an external data source—that is, a data source that is not maintained by the provider of the online service—data pre-processing may involve identifying company names and mapping those names to a standardized company identifier using a taxonomy that is maintained by the provider of the online service.

Figure 4:
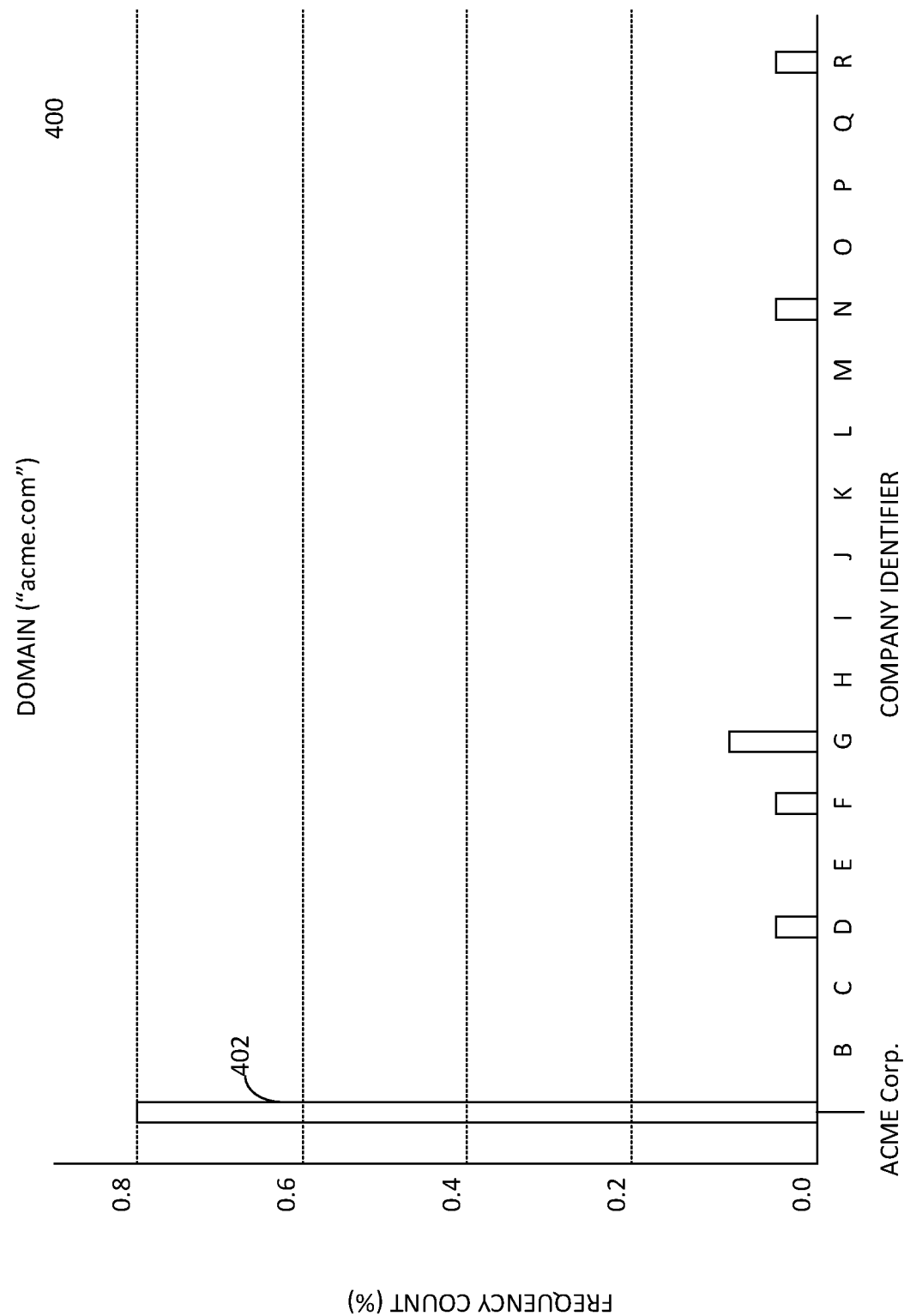
FIGS. 4 and 5 are examples of bar charts illustrating statistical distributions indicating, for a domain name, the frequency with which several company names co-occur with the domain name in data records of a particular data source, consistent with embodiments of the invention.
Figure 5:
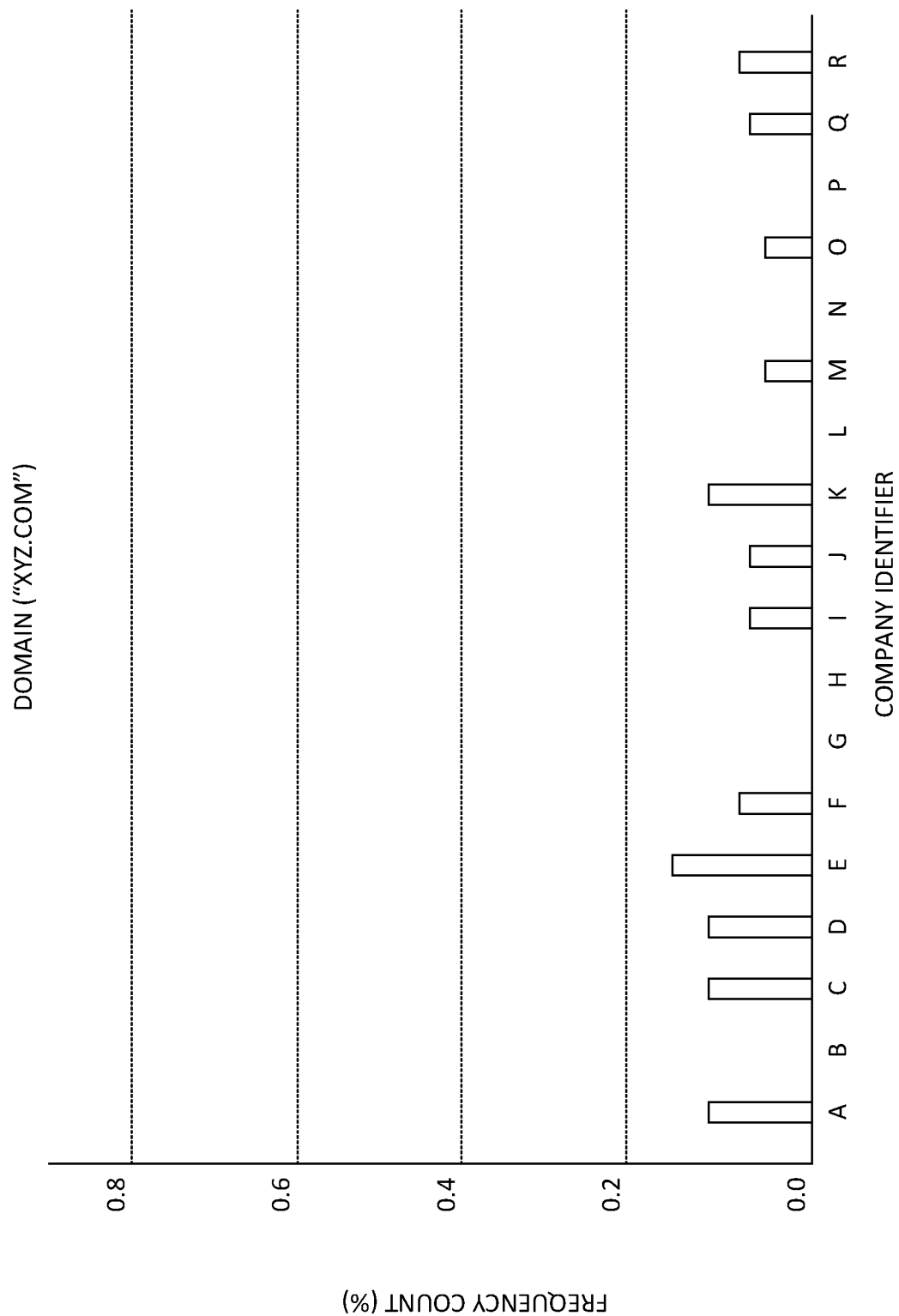

Once the data records from the various data sources have been pre-processed, the data from each individual data source is processed to generate various statistical distributions indicating, for each domain identified in a data record of the specific data source, the frequency with which a company name or company identifier occurs in the same data record with the domain name. By way of example, a first set of statistical distributions may be generated from processing data associated with a first data source, such as user profiles. Each individual statistical distribution will indicate for a particular domain (e.g., "acme.com"), the frequency or relative frequency of various company names (e.g., "ACME Corp.") or company identifiers. In this case, each measure of frequency is based on actual observed data, and each measure of frequency will be used as a confidence score to predict or infer an actual relationship between a company name and domain. Examples of bar charts showing individual instances of a statistical distribution for the domains, "acme.com" and "XYZ.com" are shown in FIGS. 4 and 5, respectively. A second set of statistical distributions may be generated from processing data obtained from data records associated with online job postings. Similarly, a third set of statistical distributions may be generated from data obtained from data records from a corporate database and/or an externally hosted database, for example, storing records relating to agreements and contracts.

After the statistical distributions from each data source have been generated, a software-implemented statistical analysis service 130 performs a statistical test—specifically, what is referred to as a test of uniformity, or simply, uniformity test—on each statistical distribution to determine whether the statistical distribution is uniformly distributed, or non-uniformly distributed. Any one of several uniformity tests may be used. In general, a uniformity test is a type of statistical hypothesis test that involves deriving what is commonly known in the field of statistics as a p-value, which indicates the likelihood of the null hypothesis being true. In this instance, the null hypothesis is that the distribution is uniform. Accordingly, when the p-value for the uniformity test is lower than some threshold, referred to as the significance level and denoted as alpha ("$\alpha$"), the null hypothesis is to be rejected. When the null hypotheses is rejected in favor of the alternative hypothesis, the distribution is determined to be non-uniform. A p-value greater than the designated value of $\alpha$ for the particular uniformity test being performed indicates that the null hypothesis is likely true, and suggests a statistical likelihood that the distribution is uniform. With some embodiments, the statistical testing of the distributions is accomplished using one of a number of statistical analysis software libraries that provide pre-programmed functions for performing statistical tests of the kind described herein.

Consistent with some embodiments, for each statistical distribution that is determined to be non-uniform—that is, the p-value resulting from the uniformity test is less than or equal to the designated significance level (e.g., value of $\alpha$) for the test—one or more of the company to domain mappings are selected for subsequent analysis. For example, with some embodiments, the company associated with the highest measure of frequency for the distribution is selected. Alternatively, with some embodiments, each company having a measure of frequency (e.g., frequency score or relative frequency) that exceeds some predetermined threshold may be selected. In any case, for each selected company, an overall company-level confidence score is derived for the company to domain mapping for that company and domain pairing.

By way of example and with reference to FIG. 4, in the bar chart 400, the bar 402 associated with the company, "ACME Corp.," indicates that "ACME Corp." has a confidence score of 0.8, which is the highest of any company in the bar chart 400. Accordingly, the company to domain mapping for "ACME Corp." and "acme.com" is selected for purposes of calculating an overall company-level confidence score for the company to domain mapping. As such, the confidence score (e.g., 0.8) for the company to domain mapping as shown in FIG. 4 is provided as one input (e.g., a sub-score) to the score aggregator 132, along with any confidence scores for the company to domain mapping that resulted from other statistical distributions that are based on other data sources. The score aggregator 132 uses a machine learned model that takes the form of a linear weighted combination to combine the individual sub-scores to derive a final, company-level confidence score for the company to domain mapping.

Because there are different sets of statistical distributions, with each set being derived from a different data source, it is possible that a first statistical distribution associated with a domain, as derived from a first data source (e.g., user profiles), may be uniform, whereas a statistical distribution for the same domain, as derived from a second data source (e.g., online job postings) may be non-uniform. With some embodiments, so long as any one of the distributions for the same domain is determined to be non-uniform, one or more company to domain mappings from that non-uniform distribution will be selected for purposes of deriving an overall, company-level confidence score. Furthermore, when a particular company to domain mapping has been selected for deriving a company level confidence score, the confidence scores (e.g., sub-scores) for that particular company to domain mapping as derived from other data sources are provided as input to the score aggregator 132 for purposes of deriving the company-level confidence score for the particular company to domain mapping.

The score aggregator 132 derives the company-level confidence scores for these selected company to domain mappings by combining the individual sub-scores for select company to domain mappings that result from the various data sources. For example, by analyzing data records associated with user profiles, a first confidence score may be derived for a particular company to domain mapping. Similarly, by analyzing online job postings, a second confidence score may be derived for the particular company to domain mapping. A third confidence score may be derived for the particular company to domain mapping from data associated with some third data source, such as data associated with sales and or vendor relationships from a corporate or third-party database. Each of the individual confidence scores is a sub-score, provided as input to the score aggregator 132, for purposes of deriving the overall company-level confidence score for the company to domain mapping. The output of the score aggregator 132 is a company-level confidence score that indicates for a particular company and domain mapping, the likelihood that the domain name is actually associated with the particular company. If the company-level confidence score for a company and domain name exceeds some predetermined threshold, the company to domain mapping will be added as a trusted company to domain mapping to a database 136. Accordingly, when a user is attempting to transact on behalf of a particular company, the user may be allowed to complete the transaction if a domain name specified in the user's verified email address matches a domain name included in a trusted company to domain mapping included in the database 136. However, if a user is attempting to transact on behalf of a company, and the domain name portion of the user's email address does not match a domain name that is part of a trusted company to domain mapping, the user may be prompted to take one of a variety of extra steps in order to conclude a transaction. By way of example, the user may be prompted to contact a sales associate of the provider of the online service, or in some instances, provide some additional information that might be used to confirm and validate the user and/or the company. Additional details of the specific operations performed by the various components of the data validation service 122 are described in greater detail below, in connection with the description of FIGS. 2 and 3.

Figure 2:
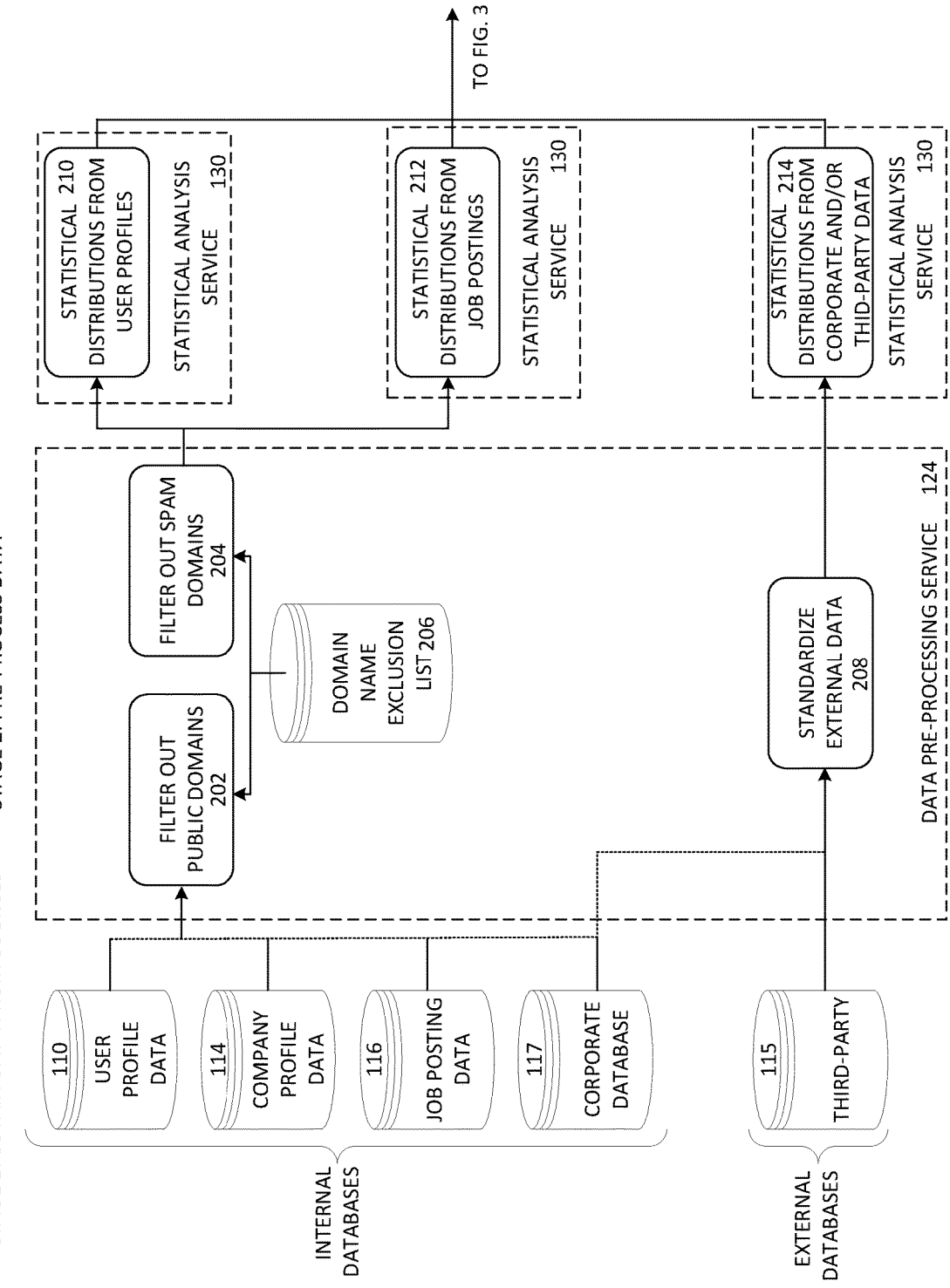
FIGS. 2 and 3 illustrate a data flow diagram, providing an example of the various operations involved in an algorithm used to generate a company-level confidence score for a company to domain name mapping, consistent with embodiments of the present invention.
Figure 3:
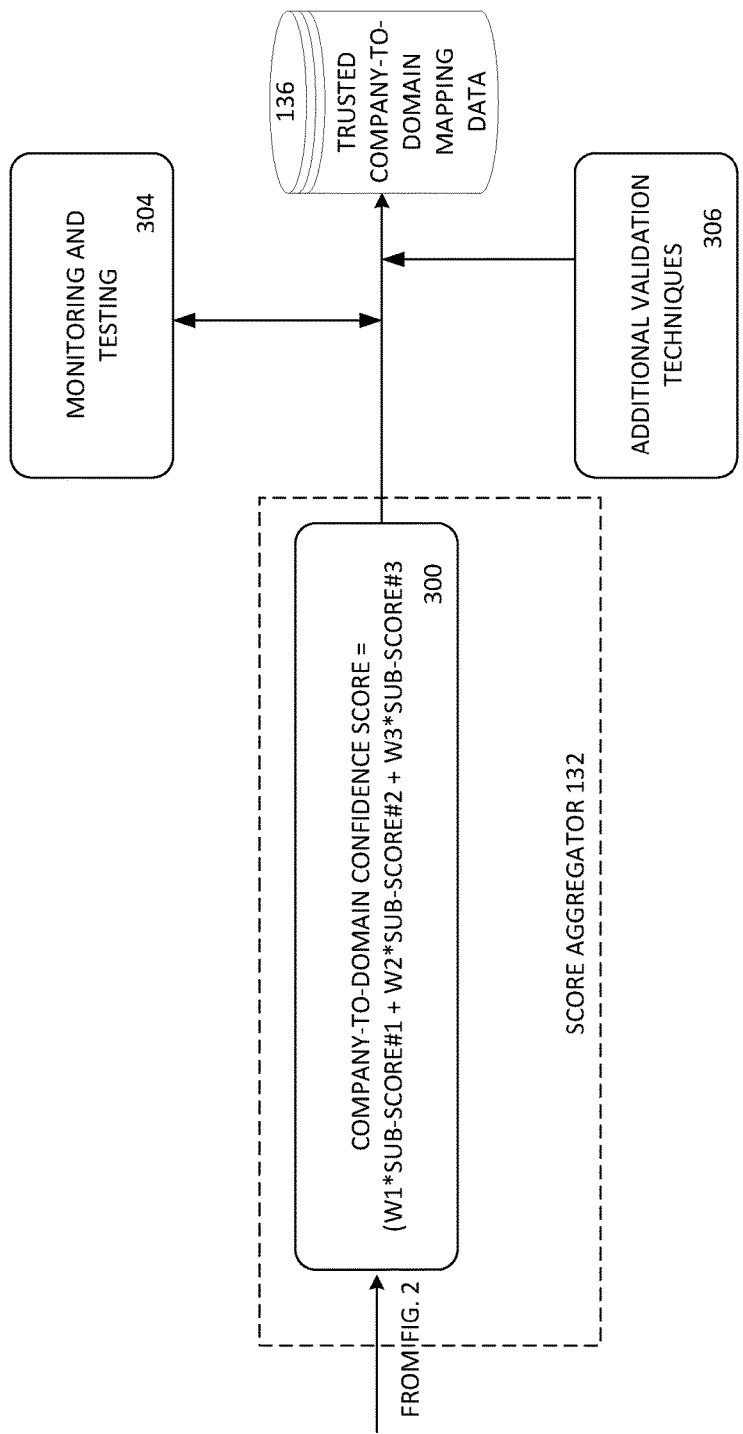

FIGS. 2 and 3 illustrate a data flow and method operations for a technique used to derive company-level confidence scores for company to domain mappings, consistent with embodiments of the invention. As illustrated in FIG. 2, a provider of an online service leverages a variety of data sources by analyzing those data sources to ascertain the extent to which a domain name co-occurs with a company name, within the data records of a particular data source. For purposes of the present disclosure, the term "data record" is meant to encompass a collection of the data fields that make up a single instance of a particular record for a particular data source. For example, each instance of a user's user profile will typically include a variety of data fields. Accordingly, in the context of the data source referred to herein as user profiles 110, a single data record is a collection of all of the data fields for a single user's user profile. Similarly, each separate instance of a company profile, or a single instance of an online job posting, is a single data record. The individual data fields that make up a single instance of a data record may, but need not necessarily, be stored in the same database. For instance, it may be the case that data fields for a single data record (e.g., a single user profile, or a single online job posting) are stored in separate databases.

As illustrated in FIGS. 2 and 3, a technique for generating company-level confidence scores for a plurality of company to domain mappings involves five distinct stages. In stage one, relevant data from a variety of data sources is first obtained. As shown in FIG. 2, the data sources include user profiles 110, company profiles 114, job posting data 116, sales and vendor data from one or more corporate databases 117, and data from one or more external databases 115. Consistent with some embodiments, the data from each data source will be processed to generate sets of statistical distributions that indicate a measure of frequency that company and domain names co-occur within the data records of the individual data sources. For example, a first set of statistical distributions may be generated using data from the user profile data 110. A second set of statistical distributions may be derived from online job posting data 116, and a third set of statistical distributions may be generated from data obtained from a corporate database 117, data obtained from one or more third-party databases 115, or some combination thereof. The data from the various data sources may be obtained by making one or more requests (e.g., database calls) to the database management systems hosting the various databases.

Stage two involves pre-processing the data and generating sets of statistical distributions for each of several different data sources. In stage two, the obtained data records from each data source are first analyzed to identify each occurrence of a domain name and a company name, within an individual data record for a particular data source. The particular analysis and data fields that are involved may vary by data source. For example, in the case of user profiles, the data field representing the user's current place of employment is analyzed to identify a company name or identifier. Additionally, the data fields for a user's contact information, specifically email addresses, are analyzed. Each email address that has been provided by a user is parsed to determine the domain name portion of the email address. By way of example, if the user's email address is "john.doe@acme.com," the email address is parsed to separate out the domain name, "acme.com." Accordingly, for each data record (e.g., user profile) the data is first parsed to identify the relevant domain names and company names. Similar data processing is performed on the data records of the other data sources.

In the case of company profiles, the relevant data fields are the name of the company, and the domain name portion of any email addresses provided by and/or associated with the authorized administrators of the company profile. Additionally, in some instances, a URL to an externally hosted company website may be processed and parsed to identify the relevant domain name. In the case of the data source referred to as job postings, a data field associated with the company name at which a job is being offered is used to identify the relevant company name or company identifier. Similarly, any URL or email address associated with the job posting may be parsed to identify relevant domain names that occur within the data record that correspond with the job posting. For example, the job posting may include an email address associated with a person who is responsible for posting the job, an email address for a hiring manager responsible for making a hiring decision relating to the job offered, and/or an email address of a recruiter who may be performing various recruiting tasks for the company. With respect to any data records analyzed from a corporate database storing information relating to sales and/or vendor contracts, the name of the company and the email addresses of any contact persons affiliated with a contract are generally analyzed to identify the relevant company and domain names, respectively.

As indicated by reference numbers 202 and 204, as part of the data record pre-processing stage, certain domain names maintained within a domain name exclusion list 206 are filtered so that they are excluded from subsequent analysis. By way of example, if a user provides a personal email address that is associated with a domain of a public email service provider (e.g., "gmail.com," "yahoo.com," "aol.com," etc.), the domain name of the public email service provider will be filtered out so that it is excluded from further analysis and will not be counted when analyzing statistical distribution at stage three. Similarly, any domain name that is known to be fake, fraudulent or otherwise related to SPAM content will be filtered and excluded from further analysis.

Consistent with some embodiments, data stored in and obtained from any internal databases may be standardized, such that each company name will have already been mapped to a standardized company identifier. However, with external data sources, such as the third-party database with reference umber 115 in FIG. 2, the obtained data records from the third-party database 115 may need to first be standardized, as shown by the operation with reference number 208. Accordingly, the company name associated with a particular company, as identified in a data record obtained from a third-party database, will first be mapped to a standardized company identifier for the company. This may be achieved by comparing the company name as identified in the obtained data record with a taxonomy of known company names that are mapped to standardized company identifiers. When a company name closely matches that of a company in the taxonomy, the company identifier may be used to identify the company for purposes of any subsequent analysis and in generating a statistical distribution.

Once the relevant data from each data record, for each data source, has been identified, a set of statistical distributions is derived for each individual data source. For example, a first set of statistical distributions is derived from the user profile data. A second set of statistical distributions is derived from the job posting data. A third set of statistical distributions is derived from a third data source. In other embodiments, additional data sources may be used to derive additional sets of statistical distributions. Each individual statistical distribution represents, for a particular domain, a measure of frequency of various companies co-occurring in the same data record as the particular domain. For example, a statistical distribution for the domain "acme.com" may indicate that the following companies co-occur in user profiles, as the company of current employment for the user, at the following relative frequencies: "ACME Corp." (0.70 or 70%), "ACME Widgets Inc." (0.1 or 10%), "ABC Company" (0.05), and so forth.

With some embodiments, the measure of frequency may be a frequency score—a raw count of the number of instances in which a company and domain co-occur in a data record. However, in alternative embodiments, the measure of frequency may be a relative frequency. The choice of which measure of frequency is used may be dependent upon the choice of the uniformity test that is being used, as some uniformity tests operate on distributions expressed as frequency scores, whereas others may operate on distributions using relative frequencies. In any case, the set of statistical distributions will include an individual statistical distribution for each domain identified in a data record of a particular data source. As shown in FIG. 2, the result of stage two is three sets of statistical distributions 210, 212 and 214, with each set of statistical distributions derived from data obtained from a different data source.

At stage three, the statistical analysis service 130 utilizes a statistical analysis software library to execute a software-based algorithm (e.g., a software function or routine) that performs a statistical test on each individual distribution to identify those distributions that exhibit non-uniformity. Any of a number of well-known software libraries, with existing software functions for performing statistical tests, may be used. Similarly, any one of several well-known uniformity tests may be used. Accordingly, the test statistic may vary, depending upon the particular uniformity test. The p-value that results from testing a distribution indicates the probability of the distribution being uniform. Accordingly, when the p-value is low, this indicates a high likelihood that the distribution is non-uniform. With some embodiments, the resulting p-value for the uniformity test is compared with a threshold, generally denoted as a, ("alpha"). While a may vary, with some embodiments, the value of a is 0.05 or 5%. Accordingly, when the p-value is below 0.05 or 5%, the distribution is determined to be non-uniform.

Consistent with some embodiments, the statistical test of the statistical distribution is accomplished using an open-source Python library known as the SciPy library. The specific statistical test used is referred to as the Kolmogorov-Smirnov test for goodness of fit. A software function of the SciPy library implementing the Kolmogorov-Smirnov test performs the statistical test of the statistical distribution of an observed random variable (e.g., a sub-score, representing a measure of frequency for a company to domain name mapping) against a theoretical or reference distribution having a uniform distribution. The software function returns the p-value, representing the probability of the statistical distribution being uniform. Accordingly, when the p-value is less than or equal to the designated value of alpha—the significance level for the test—the statistical distribution is determined to be non-uniform.

As an example, FIG. 4 is an illustration of a bar chart that has been generated based on a statistical distribution. While the statistical distribution associated with the example bar chart 400 shown in FIG. 4 is associated with the specific domain name, "acme.com," it will be appreciated that a similar distribution will be generated for each of several domain names. Furthermore, the particular example shown in FIG. 4 is one of several distributions that may be generated for the domain, "acme.com," with separate distributions being generated using data from each of several different data sources.

The bar charts shown in FIGS. 4 and 5 are presented to convey an understanding of what is meant by a uniform and non-uniform distribution. Specifically, the bar chart of FIG. 4 is a non-uniform distribution, while the bar chart of FIG. 5 is a uniform distribution. While a person may recognize characteristics of a distribution that is charted and visually displayed, that is not feasible for automated systems like the present invention. Instead, as is shown in FIG. 4, embodiments of the present invention use software algorithms that involve analyzing data stored in the memory of a computer system to make determinations about the characteristics of the distributions. Specifically, the statistical analysis service 130 is a software-based program that executes on a computer system and uses a software library that provides specific pre-programmed routines for performing various statistical tests on data.

Consistent with some embodiments, each statistical distribution that is generated may be a frequency distribution, indicating for a particular domain name a raw count of instances in which a company name occurs in the same data record with the domain name. However, consistent with some embodiments, the raw count of occurrences of a company may be normalized, for example, by dividing the raw count of occurrences of a single company by the total number of observations for all companies, to generate a relative frequency distribution. The example bar chart 400 shown in FIG. 4 is an example of a relative frequency distribution for the domain name, "acme.com". As may be ascertained from the bar with reference number 402 in the bar chart 400, the company, "ACME Corp." occurs with the domain name, "acme.com" in eighty percent ("0.8") of data records that include "acme.com" as a domain name in an email address. The companies represented in the chart 400 by the letters, "D," "F," "G," "N," and "R" co-occur with the domain name, "acme.com" far less frequently. From this bar chart 400, one may accurately conclude that there is a strong association or relationship between the domain name, "acme.com" and the company, "ACME Corp." The probability value (e.g., "0.8") will be used as a sub-score from this particular statistical distribution for the pairing of the company, "ACME" and the domain name, "acme.com" to generate a company-level confidence score for the company to domain mapping (i.e., "ACME Corp." to "acme.com") by combining the sub-score with other sub-scores, derived from statistical distributions resulting from other data sources (e.g., online job postings, etc.).

As illustrated in FIG. 5, a second distribution has been charted. In this example, each letter along the x-axis is meant to be a company name that co-occurs in a data record with the domain, "XYZ.com", whereas the height of each bar is meant to convey the frequency with which a company name co-occurs in a data with record with the domain, "XYZ.com." The distribution illustrated in FIG. 5 is a uniform distribution, and thus, when tested as described herein, would have p-value that exceeds the threshold, indicating a high likelihood of the distribution being uniform.

Referring now to FIG. 3, at stage four, for any distribution that is determined to be non-uniform, one or more of the company to domain mappings associated with that distribution are selected for generating a company-level confidence score for the company to domain mapping. For example, if a particular statistical distribution is determined to be non-uniform, the company having the highest measure of frequency as co-occurring with the domain may be selected. Alternatively, with some embodiments, a company to domain mapping may be selected for purposes of generating a company-level confidence score the particular mapping, based on the measure of frequency pf the company co-occurring being greater than some threshold. Accordingly, under certain circumstances, it may be the case that more than one company to domain mapping may be selected from a single statistical distribution.

In any case, as illustrated in FIG. 3, the individual confidence scores for a particular company to domain mapping, as derived from each of the different data sources, are provided together as input (e.g., sub-scores) to a machine learned model. In this instance, as illustrated with reference number 300, the model combines the individual sub-scores using a weighted linear combination to derive a final company-level confidence score for the particular company to domain mapping. As illustrated in FIG. 3, during stage four, three individual sub-scores for a pairing of a domain name and a company are combined using the linear weighted combination 300, where the weighting factors (e.g., "W1," "W2," and "W3") have been learned based on a supervised machine learning algorithm, as described in greater detail in connection with FIG. 6. For instance, as shown in FIG. 3, each of the individual weighting factors, "W1," "W2," and "W3" are multiplied with their corresponding sub-score, before the resulting products are summed, to generate an overall company-level confidence score for a combination of a company and a domain.

Consistent with some embodiments, if the confidence score for a particular combination of a company and domain name exceeds some predetermined threshold, then that company to domain mapping is added, with the corresponding confidence score, as a trusted company to domain mapping to database 136. When a user is attempting to complete a transaction via the online service, such as posting an online job posting to the job hosting service, the domain name portion of the email address of the user can be compared to those domain names that are included as part of a trusted company to domain mapping in the database 136 to determine whether the user is authorized to post an online job posting and for which company. For example, if a user with an email address, "john.doe@acme.com" is attempting to generate an online job posting, the domain name of the email address of the user making the request may be compared with information in the database 136 to determine whether the user's email address is associated with a trusted company to domain mapping. Assuming that the company to domain mapping for the company, "AMCE Corp.," to domain, "acme.com" is included as a trusted company to domain mapping in the database 136, the user would be authorized and allowed to generate a job posting on behalf of ACME Corp., but not necessarily for other companies.

Referring again to FIG. 3, consistent with some embodiments, at stage five of the overall process, evaluation and monitoring may occur. In some instances, a company-level confidence score for a company to domain mapping may not exceed the predetermined threshold, but instead may fall within some predefined range just below the threshold. When a company-level confidence score for a company to domain mapping falls just below the threshold, activity related to that company may be monitored and user feedback may be obtained. By analyzing these activities and feedback, if there is a sufficient volume of data (e.g., activity and/or feedback) relating to a particular company associated with a company to domain mapping, the company to domain mapping may be added to a queue for subsequent analysis and confirmation. For instance, on some periodic schedule, an administrator associated with the service provider may perform research, or submit information to a crowdsourcing service, for the purpose of attempting to validate or confirm 306 the status of a company to domain relationship. Upon determining that a particular company to domain mapping is valid—that is, actually exists—the administrator may manually add the company to domain mapping to the trusted company to domain database 136. Similarly, overtime, as new users register with the online service, and as additional data (e.g., user profiles, online job postings, corporate records) are generated, the machine learning algorithm by which the model 300 is learned may be updated by processing additional training data.

Figure 6:
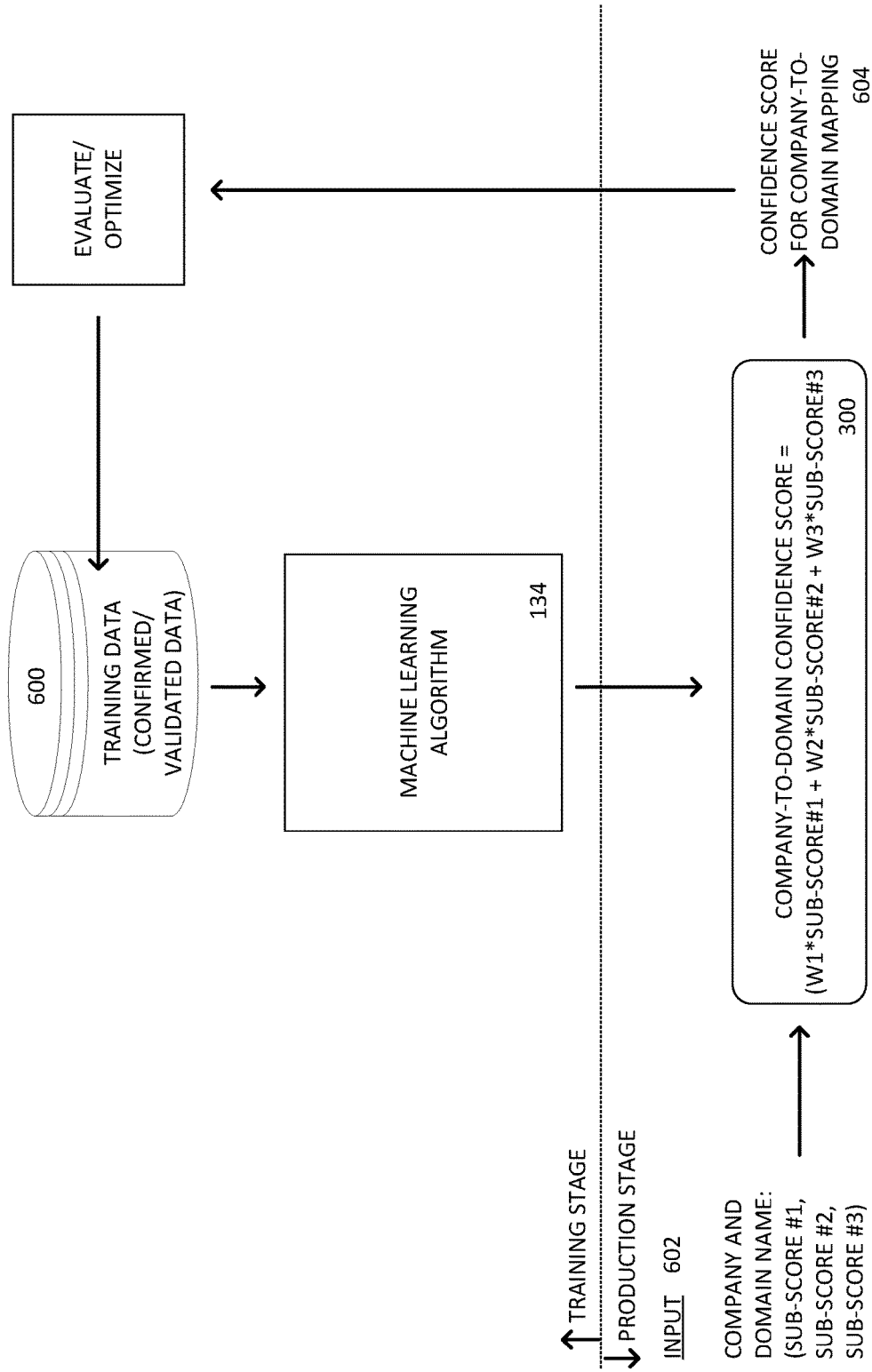
FIG. 6 is a system level diagram illustrating a technique for using a supervised machine learning algorithm to train a model to generate a company-level confidence score, consistent with embodiments of the invention.

FIG. 6 is a diagram illustrating a technique by which a machine learned model is trained to generate a company-level confidence score for a company to domain mapping, based on a plurality of sub-scores, consistent with some embodiments. As illustrated in FIG. 6, during a training stage, a machine learning algorithm 134 is provided example data (e.g., training data 600), with the objective of learning the weighting factors (e.g., "W1," "W2," and "W3") used by the scoring model 300 to predict whether a company to domain mapping actually exists. By way of example, the equation in FIG. 6 with reference 300 represents the machine learned model. During the inference or prediction stage, the inputs 602 to the trained model are three sub-scores (i.e., "sub-score #1," "sub-score #2," and "sub-score #3"), which are summed, after each sub-score is multiplied by a learned weighting factor (i.e., "W1," "W2," and "W3"). As each sub-score is a confidence score indicating for a company to domain mapping the likelihood of an actual association or relationship, derived from a specific data source, each weighting factor represents the importance or accuracy of that data source in predicting the existence, or non-existence, of an actual relationship between a company and domain. For instance, the first sub-score (e.g., "sub-score #1") may be derived from user profile data. In that case, the first weighting factor (e.g., "W1") is a learned weight that represents the importance or accuracy of the data source, user profiles, in predicting the existence or non-existence of an actual relationship between a company and a domain. As such, if data from a first data source (e.g., user profiles) is a better predictor of the actual status of a relationship between a company and a domain than data from a second data source (e.g., job postings), then the weighting factor for the first data source will tend to be greater than that of the second data source.

The general approach used to train the machine learned model 300 used by the score aggregator 132 is a supervised learning technique involving linear regression. The training data 600 consists of sub-scores—that is confidence scores derived from individual statistical distributions—for company to domain mappings that have been confirmed to actually exist, or actually not exist. In this case, confirmation is generally a manual process. The training data 600 will include sets of labeled sub-scores where the label may be for a positive example, indicating that the sub-scores for a particular company to domain mapping are associated with a company to domain mapping that is known to actually exist, and sets of labeled sub-scores where the label may be for a negative example, indicating that the sub-scores are associated with a company to domain mapping that is known to not exist. Generally, the training data is selected based on the existence of a sufficient amount of data being available for all data sources. For example, the sub-scores for the company to domain mappings that are used as training data should be for company to domain mappings that have a sufficient occurrence in all data sources being analyzed.

Consistent with some embodiments, during the training stage, each of the several weighting factors (e.g., "W1," "W2," and "W3") may initially be set to the same value (e.g., 0.5). An objective function or loss function is used to evaluate the performance of the model, for example, by manipulating the weighting factors to minimize an error, based on the provided training data. As the machine learning algorithm 134 processes the training data, an error value derived in accordance with the selected objective function or loss function is minimized by adjusting the weighting factors. Accordingly, over time as the model is trained, the weighting factors are adjusted to reflect their relative importance in accurately predicting the status of the relationship between a company and a domain. Consistent with some embodiments, the threshold that is used to determine whether a particular confidence score for a company to domain mapping represents an actual relationship (e.g., the confidence score exceeds the threshold) or not (e.g., the confidence score does not exceed the threshold) is a hyper-parameter of the model, which may be fine-tuned during the training stage. For example, subsequent to initially training the model 300, if predictions based on the original threshold prove to be false or inaccurate, the threshold may be increased or decreased to ensure that subsequent predictions (e.g., based on the company-level confidence score) are accurate. Once fully trained and tested, the model 300 is deployed in a production setting and provided with input data (e.g., sub-scores derived from the various statistical distributions) 602 similar to those used in training the model, and the model 300 then generates a prediction (e.g., a company-level confidence score) 604 for each instance of a set of sub-scores associated with pairing of a company and a domain.

Figure 7:
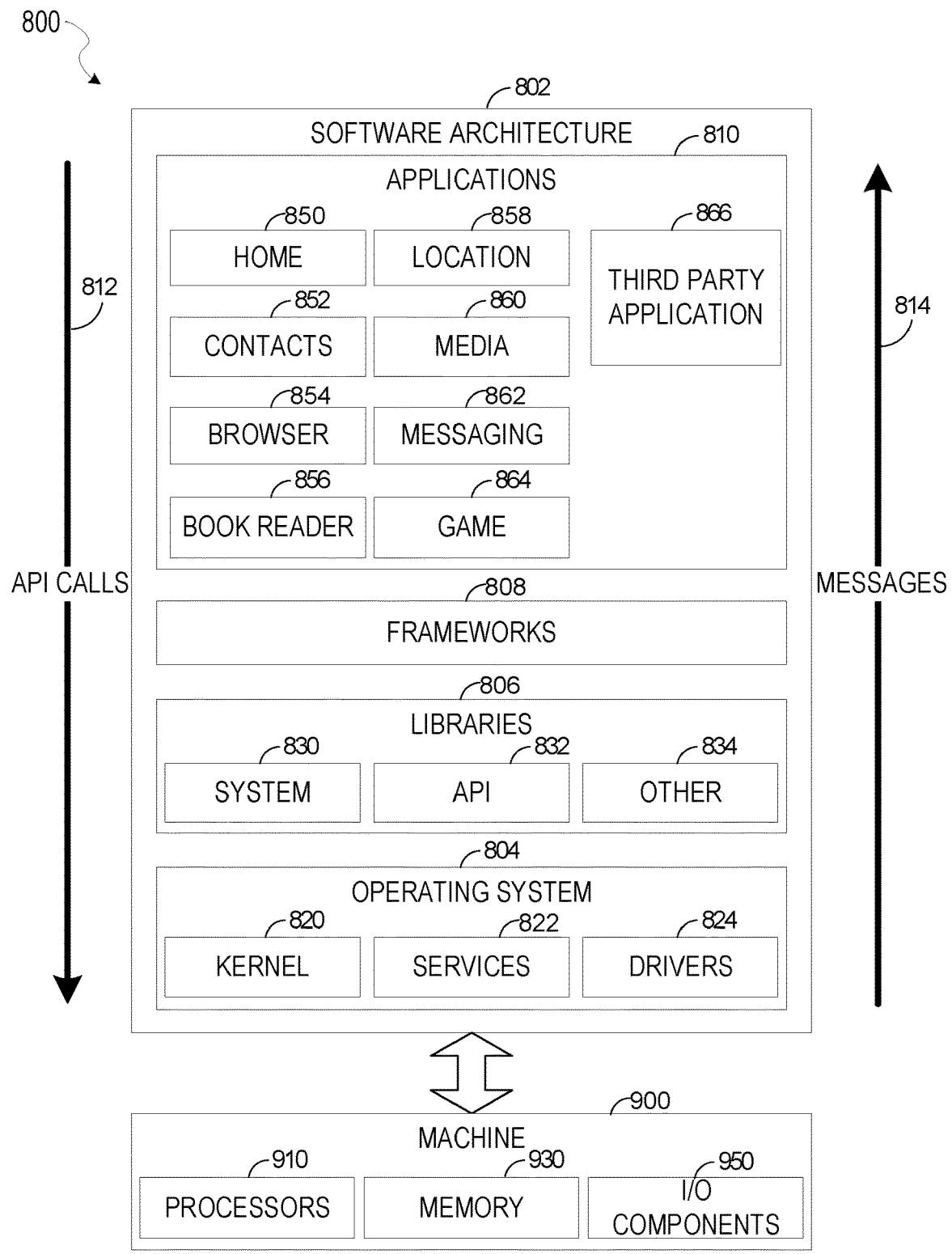
FIG. 7 is a is a diagram illustrating a software architecture, in accordance with an example embodiment.
Figure 8:
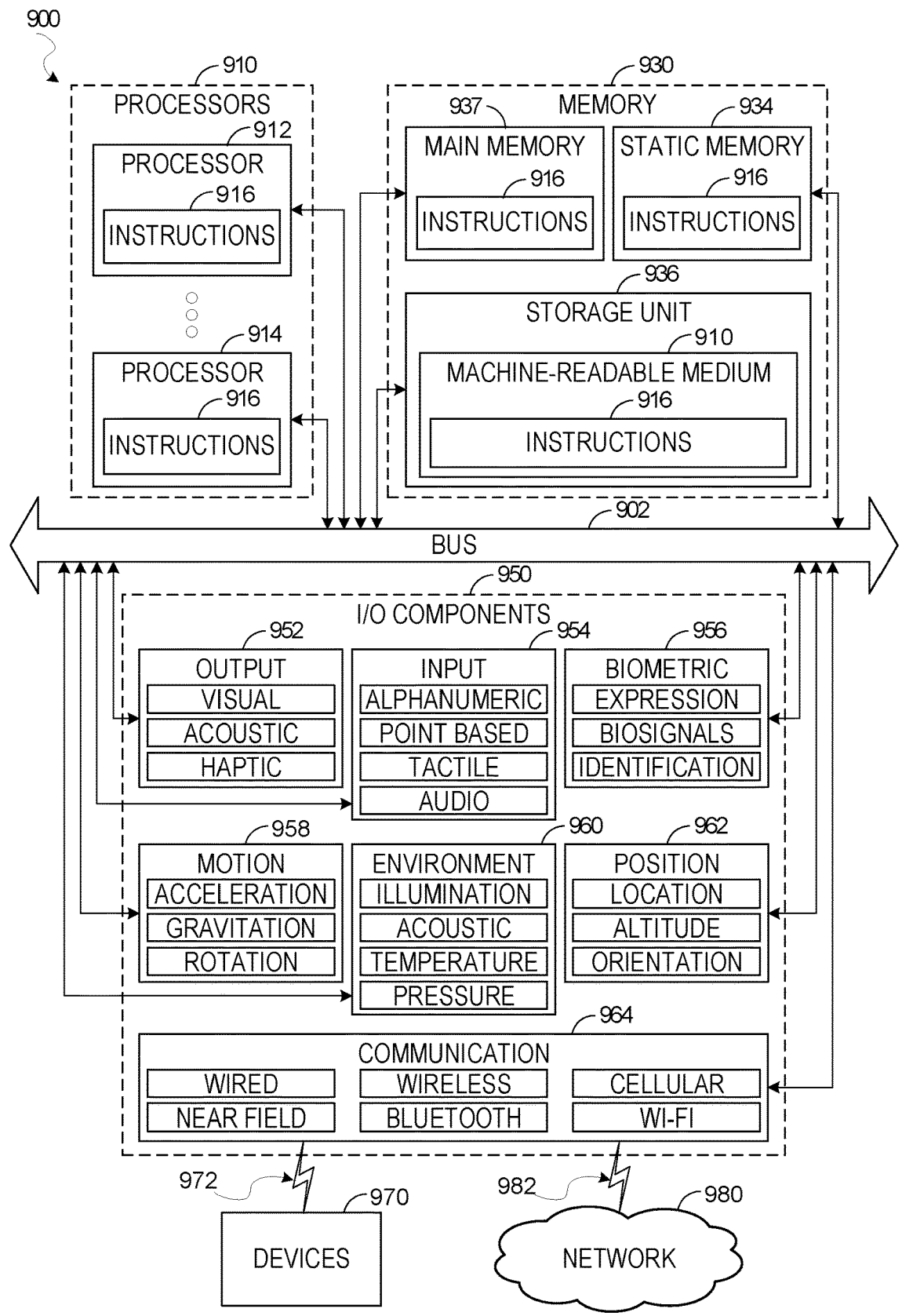
FIG. 8 illustrates a diagrammatic representation of a machine in the form of a computer system within which a set of instructions may be executed for causing the machine to perform any one or more of the methodologies discussed herein, consistent with embodiments of the present invention.

FIG. 7 illustrates a diagrammatic representation of a machine 900 in the form of a computer system within which a set of instructions may be executed for causing the machine to perform any one or more of the methodologies discussed herein, according to an example embodiment. Specifically, FIG. 8 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithms described herein. Additionally, or alternatively, the instructions 916 may implement a system described in connection with any of FIG. 1, 2 or 3, and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method, comprising:
with a machine learning algorithm, training a linear regression model to output a confidence score for a company to domain name mapping based on input comprising a plurality of sub-scores, each sub-score based on the co-occurrence frequency of the domain name and a company name for the company within a data record of a data source;
for each data source of a plurality of data sources, processing data records from the data source to derive a statistical distribution indicating for each domain name of a plurality of domain names the co-occurrence frequency of the domain name and a company name within a data record of the data source;
determining whether the statistical distribution is a non-uniform distribution by executing a software function to perform a statistical test of the statistical distribution, the statistical test comprising a uniformity test that compares a sample from the statistical distribution with a reference distribution;
in response to determining that the statistical distribution is a non-uniform distribution, deriving the confidence score for the company to domain name mapping by providing as input to the trained linear regression model the plurality of sub-scores;
determining that the confidence score for the company to domain name mapping exceeds a second predetermined threshold by comparing the confidence score with the second predetermined threshold; and
in response to determining that the confidence score for the company to domain name mapping exceeds the second predetermined threshold, adding to a database a data record indicating the company name of the company and the domain name.

2. The computer-implemented method of claim 1, wherein training the linear regression model comprises:
with the machine learning algorithm, training the linear regression model with training data that has been labeled to indicate that a status of a relationship between a domain name and a company name is known, each instance of training data comprising a plurality of sub-scores, each sub-score based on the co-occurrence frequency of a domain name and a company name within a data record of a data source.

3. The computer-implemented method of claim 1, wherein a first data source in the plurality of data sources is user profiles, and processing data records from the user profiles to derive a statistical distribution indicating for each domain name of a plurality of domain names the co-occurrence frequency of the domain name and the company name within a data record of the user profiles, comprises:
for each user profile of a plurality of user profiles:
determining a company identifier of a company indicated in the user profile as an employer of the user;
parsing an email address specified in the user profile to identify a domain name of the email address; and
filtering out any domain name included in a list of domain names to be excluded, and
deriving the statistical distribution for each domain name by aggregating a count of instances in which each company identifier occurs with a domain name within a user profile.

4. The computer-implemented method of claim 1, wherein a second data source in the plurality of data sources is online job postings, and processing data records from the online job postings to derive a statistical distribution indicating for each domain name of a plurality of domain names the co-occurrence frequency of the domain name and the company name within a data record of the online job postings, comprises:
for each online job posting of a plurality of online job postings:
determining a company identifier of a company indicated in the online job posting as a company offering a job described in the online job posting;
parsing at least one email address specified in the online job posting to identify at least one domain name in the at least one email address;
parsing at least one URL associated with the online job posting to identify at least one domain name included in the at least one URL; and
filtering out any domain name included in a list of domain names to be excluded, and
deriving the statistical distribution for each domain name by aggregating a count of instances in which each company identifier occurs with a domain name within an online job posting.

5. The computer-implemented method of claim 4, wherein parsing the at least one email address in the online job posting to identify at least one domain name in the at least one email address comprises:
parsing an email address associated with a contact person for the online job posting, the contact person being specified as one of: a contact person for submission of job applications, or a hiring manager for the job described in the online job posting.

6. The computer-implemented method of claim 4, wherein parsing at least one URL associated with the online job posting to identify at least one domain name included in the at least one URL comprises:
parsing a URL provided with the online job posting and identified as a URL via which an application for the job described in the online job posting can be submitted by a job applicant.

7. The computer-implemented method of claim 4, wherein parsing at least one URL associated with the online job posting to identify at least one domain name included in the at least one URL comprises:
parsing a URL associated with a website from which the online job posting was ingested.

8. The computer-implemented method of claim 1, wherein a third data source in the plurality of data sources is an external data source, and processing data records from the external data source to derive a statistical distribution indicating for each domain name of a plurality of domain names the co-occurrence frequency of the domain name and the company name within a data record of the external data source, comprises:

for each data record of a plurality of data records:
  mapping a company name identified in the data record to a company identifier using a standardized company taxonomy;
  parsing at least one email address or at least one URL specified in the data record to identify at least one domain name in the at least one email address or the at least one URL; and
  filtering out any domain name included in a list of domain names to be excluded, and
deriving the statistical distribution for each domain name by aggregating a count of instances in which each company identifier occurs with a domain name within a data record.

9. The computer-implemented method of claim 1, further comprising:
  subsequent to adding to the database a data record indicating the company name and the domain name, receiving a request associated with a user to generate a new online job posting; and
  validating the request by comparing a domain name parsed from an email address of the user with domain names included in data records of the database.

10. A system comprising:
  at least one processor; and
  a computer storage device storing instructions, which, when executed by the at least one processor, cause the system to perform operations comprising:
  with a machine learning algorithm, training a linear regression model to output a confidence score for a company based on input comprising a plurality of sub-scores, each sub-score based on the co-occurrence frequency of a domain name and a company name within a data record of a data source;
  for each data source of a plurality of data sources, processing data records from the data source to derive a statistical distribution indicating for each domain name of a plurality of domain names the co-occurrence frequency of the domain name and a company name within a data record of the data source;
  determining whether the statistical distribution is a non-uniform distribution by executing a software function to perform a statistical test of the statistical distribution, the statistical test comprising a uniformity test that compares a sample from the statistical distribution with a reference distribution;
  in response to determining that the statistical distribution is a non-uniform distribution, deriving the confidence score for the company to domain name mapping by providing as input to the trained linear regression model the plurality of sub-scores;
  determining that the confidence score for the company to domain name mapping exceeds a second predetermined threshold by comparing the confidence score with the second predetermined threshold; and
  in response to determining that the confidence score for the company to domain name mapping exceeds the second predetermined threshold, adding to a database a data record indicating the company name of the company and the domain name.

11. The system of claim 10 wherein the computer storage device is storing additional instructions that cause the system to perform operations comprising:
  with the machine learning algorithm, training the linear regression model with training data that comprises a plurality of sub-scores, each sub-score indicating the co-occurrence frequency of a domain name and a company name within a data record of a data source, for a set of companies for which a status of a relationship between a domain name and a company name has been confirmed.

12. The system of claim 10, wherein a first data source in the plurality of data sources is user profiles, and processing data records from the user profiles to derive a statistical distribution indicating for each domain name of a plurality of domain names the co-occurrence frequency of the domain name and the company name within a data record of the user profiles, comprises:
  for each user profile of a plurality of user profiles:
    determining a company identifier of a company indicated in the user profile as an employer of the user;
    parsing an email address specified in the user profile to identify a domain name of the email address; and
    filtering out any domain name included in a list of domain names to be excluded, and
  deriving the statistical distribution for each domain name by aggregating a count of instances in which each company identifier occurs with a domain name within a user profile.

13. The system of claim 10, wherein a second data source in the plurality of data sources is online job postings, and processing data records from the online job postings to derive a statistical distribution indicating for each domain name of a plurality of domain names the co-occurrence frequency of the domain name and the company name within a data record of the online job postings, comprises:
  for each online job posting of a plurality of online job postings:
    determining a company identifier of a company indicated in the online job posting as a company offering a job described in the online job posting;
    parsing at least one email address specified in the online job posting to identify at least one domain name in the at least one email address;
    parsing at least one URL associated with the online job posting to identify at least one domain name included in the at least one URL; and
    filtering out any domain name included in a list of domain names to be excluded, and
  deriving the statistical distribution for each domain name by aggregating a count of instances in which each company identifier occurs with a domain name within an online job posting.

14. The system of claim 13, wherein parsing the at least one email address in the online job posting to identify at least one domain name in the at least one email address comprises:
  parsing an email address associated with a contact person for the online job posting, the contact person being specified as one of: a contact person for submission of job applications, or a hiring manager for the job described in the online job posting.

15. The system of claim 13, wherein parsing at least one URL associated with the online job posting to identify at least one domain name included in the at least one URL comprises:
  parsing a URL provided with the online job posting and identified as a URL via which an application for the job described in the online job posting can be submitted by a job applicant.

16. The system of claim 13, wherein parsing at least one URL associated with the online job posting to identify at least one domain name included in the at least one URL comprises:

parsing a URL associated with a website from which the online job posting was ingested.

17. The system of claim 10, wherein a third data source in the plurality of data sources is an external data source, and processing data records from the external data source to derive a statistical distribution indicating for each domain name of a plurality of domain names the co-occurrence frequency of the domain name and the company name within a data record of the external data source, comprises:

for each data record of a plurality of data records:
- mapping a company name identified in the data record to a company identifier using a standardized company taxonomy;
- parsing at least one email address or at least one URL specified in the data record to identify at least one domain name in the at least one email address or the at least one URL; and
- filtering out any domain name included in a list of domain names to be excluded, and deriving the statistical distribution for each domain name by aggregating a count of instances in which each company identifier occurs with a domain name within a data record.

18. The system of claim 10, further comprising:

subsequent to adding to the database a data record indicating the company name and the domain name, receiving a request associated with a user to generate a new online job posting; and validating the request by comparing a domain name parsed from an email address of the user with domain names included in data records of the database.

19. A system comprising:

a processor;

means for training a model to output a confidence score for a company based on input comprising a plurality of sub-scores, each sub-score based on a measure of frequency with which a domain name and a company name occur within the same data record of a data source;

for each data source of a plurality of data sources, means for processing data records from the data source to derive a statistical distribution indicating for each domain name of a plurality of domain names the co-occurrence frequency of the domain name and a company name within a data record of the data source;

means for determining whether the statistical distribution is a non-uniform distribution by executing a software function to perform a statistical test of the statistical distribution, the statistical test comprising a uniformity test that compares a sample from the statistical distribution with a reference distribution;

means for deriving the confidence score for the company to domain name mapping by providing as input to the trained linear regression model the plurality of sub-scores, in response to determining that the statistical distribution is a non-uniform distribution;

means for determining that the confidence score for the company to domain name mapping exceeds a second predetermined threshold by comparing the confidence score with the second predetermined threshold; and in response to determining that the confidence score for the company to domain name mapping exceeds the second predetermined threshold, means for adding to a database a data record indicating the company name of the company and the domain name, in response to determining that the confidence score for the company to domain name mapping exceeds the second predetermined threshold.

20. The system of claim 19, further comprising:

means for receiving a request associated with a user to generate a new online job posting, subsequent to adding to the database a data record indicating the company name and the domain name; and means for validating the request by comparing a domain name parsed from an email address of the user with domain names included in data records of the database.

* * * * *